United States Patent [19]
Pitner

[11] 3,710,471
[45] Jan. 16, 1973

[54] METHOD OF MAKING A COMPOSITE BEARING RING
[75] Inventor: Alfred Pitner, Paris, France
[73] Assignee: Nadella, Rueil-Malmaison, France; a part interest
[22] Filed: April 6, 1971
[21] Appl. No.: 131,759

[30] Foreign Application Priority Data

April 8, 1970 France.................................7012709

[52] U.S. Cl. ............................................29/148.4 R
[51] Int. Cl. ................................................B21h 1/12
[58] Field of Search....29/148.4 R, 149.5 NM, 148.4 A; 308/212

[56] References Cited

UNITED STATES PATENTS 2,376,779  5/1945  Kendall..........................29/148.4 R Primary Examiner—Thomas H. Eager
Attorney—Burns, Lobato & Zelnick

[57] ABSTRACT

A composite outer ring for a needle bearing comprising an inner sleeve of hardened thin sheet metal and a non-hardened outer collar which is a tight fit on the sleeve. The collar serves to deform the hardened sleeve so as to rectify any deviation of the shape of the sleeve inner face, which constitutes a raceway, from the desired shape due to distortion of the sleeve subsequent to the hardening of the sleeve. The shape of the outer face of the collar depends on both the desired shape of the raceway and the configuration of the cavity of the part receiving the collar.

8 Claims, 8 Drawing Figures

PATENTED JAN 16 1973  3,710,471
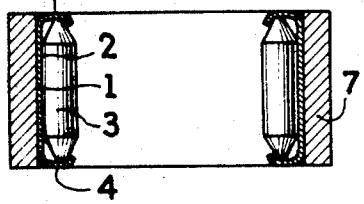
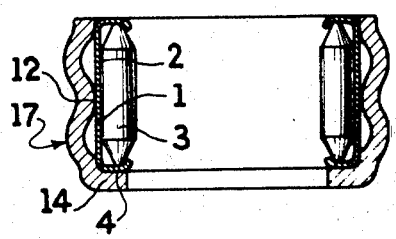
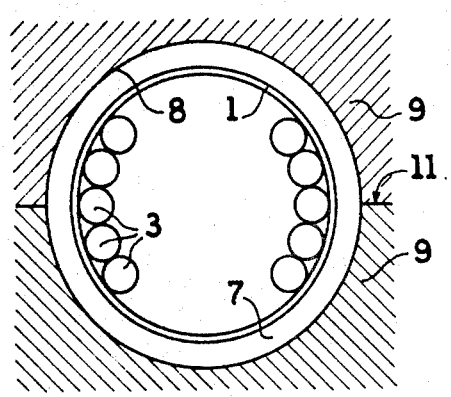
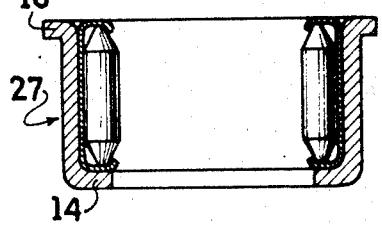
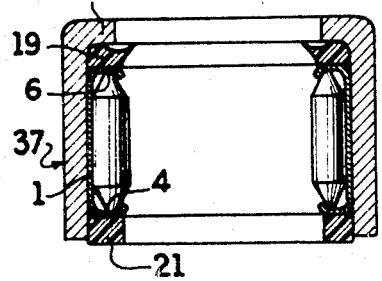
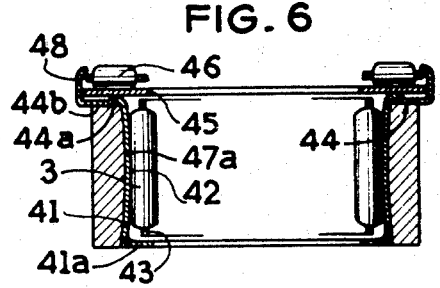
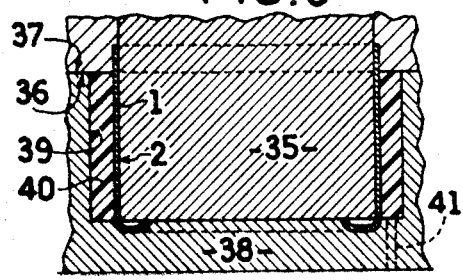
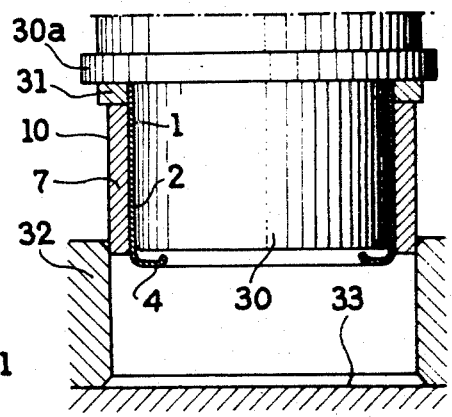

METHOD OF MAKING A COMPOSITE BEARING RING

It is known to construct needle bearing rings from thin case-hardened sheet metal without removal of metal. They may be termed sleeves so as to distinguish them from other embodiments.

This type of bearing ring can only be satisfactory for heavy loads when the hard layer or casing is sufficiently thick and the metal constituting the ring has the required mechanical properties. However, even in this case, it is necessary to consider the support in which the bearing is fitted. Indeed, this support performs s double function, namely, it puts the ring or sleeve in a round condition, since the ring is deformed by the heat treatment it undergoes, and the support has a binding action, that is, it puts the ring under radial compression so as to improve the performance under tensile forces due to the loads supported by the ring in contact with the rolling elements of the bearing. If the support cannot perform this double function, for example because it is composed of a material which does not have the required mechanical properties or has a thickness which is insufficient or non-uniform, or because it is a housing in two or more parts, a thick bearing ring has to be employed and usually the method of forming the ring without removal of metal cuttings is abandoned and thick, turned and ground rings have to be employed. Indeed, the method of forming a ring from sheet metal gives rise to the following serious difficulties when it concerns a thick sheet :

1. Difficulties which may be due to the desired shapes which it may not be possible to form in a thick sheet, bearing in mind the relatively small diameter of the rolling elements.

2. Forming from a thick sheet presents difficulties in itself and possible difficulties as regards calibration owing to the deformations required in the various layers of material.

3. The hardening heat treatment and quenching create, as in the case of a thin sheet, deformations due both to the relieving of the cold-forming tensions and to the deformations produced by the hardening treatment for forming the hard case. Owing to these deformations and bearing in mind the considerable thickness of the considered ring, the putting of the ring into a round shape in the bore is rendered difficult, even when the support behaves in a satisfactory manner, and is radically impossible when it concerns a support whose bore is composed of material having a low resistance to deformation or whose wall is thin or has a non-uniform thickness or is composed of two or more parts.

An object of the invention is to avoid both the drawbacks which necessitated the use of thick, turned and ground rings and the drawbacks related to the forming of thick sheets.

The invention provides an outer ring of a radial needle bearing which comprises two parts, namely an inner part comprising a sleeve of thin hardened sheet metal known per se, and an outer part comprising a non-hardened cylindrical collar which has a thickness preferably greater than the thickness of the sleeve, and which, as it does not have to undergo a heat treatment after having received a shape close to its final shape, therefore retains this shape, is a tight fit on the sleeve so as to put the latter into a round shape as far as possible, and whose section is then shaped in accordance with the section defining the outer raceway for the rolling elements inside the sleeve and with the configuration of the housing which is to receive the collar.

Another object of the invention is to provide a method for producing such a two-part ring comprising placing the non-hardened collar of ductile material and the surface-hardened sleeve comprising axial interconnecting means, on a cylindrical tool which bears against the inner face of the sleeve and deforms said face so as to render it truly cylindrical or to impart thereto another predetermined shape, calibrating the outer face of the collar with respect to said inner face of the sleeve so as to maintain the thickness of the composite outer ring, comprising the sleeve and the collar, as constant as possible in the axial and circumferential directions or vary said thickness of the composite ring in accordance with a given law, for example so that it is thicker in the middle of the raceway for the rolling elements than in the region of their ends.

This calibration of the thickness can be achieved in accordance with the invention by :

a. Removing material.

b. Deformation, for example between a punch or a die or a draw die, essentially of the collar which adapt itself by molecular flow to the desired thickness of the assembly of the sleeve and collar.

As a material for said collar there may be employed a thermoplastic material which may be reinforced for example by fiber glass but which has a working temperature lower than that of a tempering which reduces inadequately for subsequent use the hardness of the outer raceway in the sleeve to which this collar adheres.

There may be applied to the collar faces of non-hardened steel a coating obtained for example by phosphating or cadmium plating. Such a coating can facilitate the shaping of the collar , the mounting of the sleeve inside the collar and the mounting of the collar tightly fitted on the sleeve in the support for the collar.

In the composite ring according to the invention, the precision of the united two constituent parts is defined by the condition of constant value of the thickness, or of a value varying in accordance with a given law which gives, after fitting, the shape and desired tolerances for the outer raceway while allowing an effective putting into a round shape of the assembly mounted in a bore which has insufficient strength and is too irregular for the utilization of a simple sleeve. In this way there is obtained a bearing which is precise in operation, has a good load capacity and support very well vibrations and possible brief overloads.

Further features and advantages of the invention will be apparent from the ensuing description with reference to the accompanying drawing.

In the drawing :

FIG. 1 is a longitudinal sectional view of a composite outer ring of a bearing;

FIG. 2 is a cross-sectional view of the bearing shown in FIG. 1 mounted in a two-part bore;

FIGS. 3–6 are views similar to FIG. 1 of modifications of a composite ring;

FIG. 7 is a diagrammatic view showing an arrangement for the calibration of an assembly of a sleeve and collar, and FIG. 8 is a diagrammatic axial sectional view of an arrangement for moulding a thermoplastic material around the sleeve to form an outer collar.

The composite bearing ring shown in FIG. 1 comprises a sleeve 1 whose inner face 2 serves as an outer raceway for needles 3 which are axially retained by flanges 4, 6 on the sleeve 1. This sleeve 1 is of hardened steel and fitted inside a collar 7 of non-hardened mild steel which has a thickness greater than that of the sleeve and has been shaped externally for the purpose of the calibration of the assembly of the sleeve and collar.

In FIG. 2 the bearing having the composite ring shown in FIG. 1 is normally mounted with a tight fit in a bore 8 in a support 9 which is in two parts separated by a slit or gap 11 and thus forms a discontinuous peripheral face which does not allow a simple needle bearing sleeve or ring to be mounted directly if the required conditions of precision are to be obtained.

In the assembly just described, the raceway 2 of the composite ring is assumed to be strictly cylindrical, this cylindrical shape being obtained in accordance with required tolerances owing to the fact that it is put into a round shape by the tight gripping effect of the thick collar 7 which therefore corrects any possible non-uniformity in the shape due to the heat treatment of the sleeve 1.

In the embodiment shown in FIG. 3, the collar 17 has a thickness less than the thickness shown in FIG. 1 and stiffness is imparted thereto by annular ribs 12 which are provided in the region of the middle portion of the needles 3 and impart to the raceway 2 of the sleeve 1 a crowned shape which defines in the median plane a diameter which is less than the two end diameters of the sleeve. The collar 17 is completed by a flange 14 against which the flange 4 of the sleeve is applied and which affords a positive connection between the sleeve 1 and the collar 17 in one direction.

In the embodiment shown in FIG. 4, the collar 27 has at one end an axial retaining flange 14 and at its other end an annular rib 16.

The collar 27 shown in FIG. 5 has at one end a flange 18 which is spaced from the corresponding flange 6 of the sleeve 1 so that it is possible to interpose between the two flanges a sealing ring 19. The opposite end of the collar 27 extends beyond the other flange 4 of the sleeve 1 so that it is possible to provide another sealing ring 21 in contact with the flange 4.

FIG. 6 shows a collar 47 which is a tight fit on a sleeve 41 which is part of a combined bearing of the type for example disclosed in U.S. Pat. No. 3,341,263. At the end opposed to flange 41a which axially retains a cage 43 containing the needles 3, the sleeve 41 has an outer flange 44 which defines two annular bosses 44a, 44b, the boss 44a serving as a support for a raceway plate 45 of a thrust needle bearing 46 and the boss 44b bearing against the end face of the collar 27. The flange 44 is extended by a skirt portion 48 which radially and axially retains the bearing plate 45. In this embodiment, the inner face 47a of the collar 47 has a slightly crowned longitudinal sectional shape so that the inner raceway 42 on the sleeve 41 also has a crowned shape. Such a section can be obtained by applying the teaching of the U.S. Pat. No. 3,004,323.

There is shown in FIG. 7 an assembly whereby it is possible to calibrate the composite ring consisting of the sleeve 1 and collar 7 shown in FIG. 1 by shaping, without removal of metal cuttings, the outer face 10 of the collar 7. The sleeve 1, which has at one end the flange 4 and is open at the other end, is mounted with a force fit on a mandrel 30, the collar 7 being itself a force fit on the sleeve 1. The end of the collar opposed to the flange 4 is supported on a shoulder 30a on the mandrel 30 through a washer 31. This assembly is forced into a die 32 which bears against a table 33 of a press so as to shape the assembly of the sleeve 1 and collar 7, essentially by calibrating the thickness of the two assembled parts with tolerances usual in this type of operation, that is, tolerances of the order of those obtained in the production of the sleeve 1 or collar 7, which results in practically one half of the sum of the resulting tolerances after fitting the sleeve 1 in the collar 7. Choice of the shape of the mandrel 30 and choice of that of the die 32 enable varying the thickness of the assembly of the sleeve and collar in accordance with a predetermined law in the longitudinal and circumferential direction so as to modulate, if desired, the inner section of the sleeve. If the mandrel 30 and die 32 are cylindrical, cylindrical parts having a constant thickness — to within the tolerances — are obtained, which tolerances in respect of the assembly of the sleeve and collar are, as already mentioned, of the same order of magnitude as those normally obtained in this kind of operation for one of the two parts considered alone.

It will be understood that the outer face of the collar can be obtained by other methods, such as the outer grinding of the face 10.

After the calibrating operation shown in FIG. 7, the open end of the sleeve 1 may be closed in the hot condition so as to form the flange 6 retaining the needles mounted in the sleeve.

Alternatively, a plastics collar can be moulded around the sleeve to form a composite outer bearing ring. Thus FIG. 8 shows an arrangement for moulding a thermoplastic material around the sheet metal sleeve 1 which is mounted on a mandrel 35 so that the latter imparts the desired shape to the inner face of the sleeve 1. The mandrel 35 has an annular shoulder portion 36 surrounding the upper end portion of the sleeve 1 which corresponds to the open end of this sleeve. The shoulder portion 36 bears against a co-operating face 37 of a mould or die 38 whose cavity 39 defines the desired outer face of the collar 40. The runner or gate for supplying the thermoplastic material to the annular space between the sleeve 1 and the cavity 39 is shown diagrammatically at 41. The thermoplastic material has a working temperature which is such that the inner face 2 of the sleeve 1 does not have its hardness reduced as the result of the tempering effect of the temperature of moulding.

Having now described my invention what I claim and desire to secure by Letters Patent is:

1. A method for producing a composite bearing ring, comprising taking a sleeve of thin sheet metal having an inner face constituting a raceway, providing said inner face with a hardened surface, placing said sleeve in a collar to constitute a composite bearing ring, placing said ring on a mandrel of given shape by tightly fitting said mandrel against said inner face of said sleeve and deforming said sleeve in accordance with said given shape, and shaping the outer face of said collar to the desired shape while said composite ring is on said mandrel.

2. A method as claimed in claim 1, wherein the shaping of said outer face of said collar is such that the radial thickness of the composite ring is constant.

3. A method as claimed in claim 1, wherein the shaping of said outer face of said collar is such that the radial thickness of the composite ring varies in accordance with a predetermined law.

4. A method as claimed in claim 1, wherein said outer face is shaped by removing material from said collar.

5. A method as claimed in claim 1, wherein said outer face is shaped by deforming said collar without removing material.

6. A method as claimed in claim 5, wherein the material of said collar defining said outer face is ductile and is deformed by drawing in a die inside which there is introduced said composite ring which is a tight fit on said mandrel.

7. A method for producing a composite bearing ring comprising taking a sleeve of thin sheet metal having an inner face constituting a raceway, providing said inner face with a hardened surface, placing said sleeve on a mandrel of given shape by tightly fitting said mandrel against said inner face of said sleeve and deforming said sleeve in accordance with said given shape, placing said sleeve on said mandrel in a cavity in a mould and moulding a plastics material in said mould around said sleeve, said cavity having a shape corresponding to the desired outer shape of said composite ring.

8. A method as claimed in claim 7, wherein said plastics material has a working temperature which is such that the hardness of said hardened surface is not adversely affected to an extent incompatible with its subsequent utilization.

* * * * *